3,328,470
GREATER SELECTIVITY IN THE GUERBET
REACTION
Ronald L. Poe, Ponca City, Okla., assignor to Continental Oil Company, Ponca City, Okla., a corporation of Delaware
No Drawing. Filed Oct. 3, 1963, Ser. No. 313,440
16 Claims. (Cl. 260—642)

This invention relates to preparation of alcohols and particularly to the preparation of 2-branched alcohols by the dimerization of primary alcohols.

The Guerbet reaction is a reaction which is well-known to the organic chemist. According to the Guerbet reaction, a primary or secondary alcohol which contains a methylene group attached to the carbon atom of the carbinol group is condensed with itself (or with another alcohol of the class just described) to form as the principal product a higher alcohol containing double the number of carbon atoms of the starting alcohol, for example, n-butanol is condensed to 2-ethylhexanol. Similarly, a mixture of n-butanol and ethanol can react to form 2-ethylhexanol (by condensation of two molecules of n-butanol), n-butanol (by condensation of two molecules of ethanol), n-hexanol and 2-ethylbutanol (by condensation of a molecule of n-butanol with a molecule of ethanol). It is also apparent that a certain amount of condensation can occur between the principal higher alcohol product and unreacted starting alcohol, as well as between two molecules of the principal higher alcohol product, and on up the line, forming a series of higher molecular weight alcohols by condensation which theoretically can involve any two molecules present in the reaction mixture at a given time, if at least one of the two materials undergoing condensation contains a methylene group attached to the carbon atom of the carbinol group.

In the conventional Guerbet reaction, large amounts of catalysts are used which have the disadvantage of promoting the undersirable reactions, for example, the formation of acid. Conventionally, approximately 33 mole percent catalyst is added to the alcohol to be dimerized.

It is an object of this invention to provide an improved process for the dimerization of primary alcohols.

It is another object of this invention to provide an improved process for increasing product selectivity in the dimerization of primary alcohols.

Still another object of this invention is to provide an improved process for the dimerization of primary alcohols employing an alkali metal or alkali-metal compound as the catalyst.

The foregoing objects are realized broadly by the process of converting primary alcohol having at least one hydrogen on the beta carbon to 2-branched alcohol in the presence of a small amount of an alkali metal or alkali-metal compound catalyst. This process is exemplified by the following reaction:

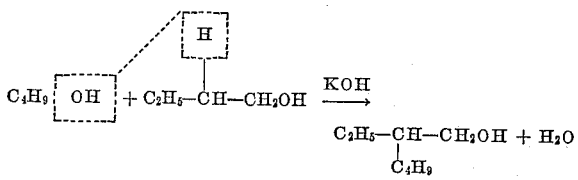

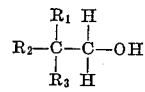

In carrying out the process of this invention, the alcohol is contacted with the dimerization catalyst preferably at an elevated temperature for a period of time sufficient to convert a substantial portion of the alcohol to the 2-branched dimer. By appropriately controlling the operating conditions under which the reaction is carried out and by utilizing an alkali-metal catalyst, it is possible to obtain selective conversion to the desired dimer alcohol in amounts exceeding 90 percent.

As stated, the reaction is carried out at an elevated temperature which can lie between about 200° C. and about 300° C. The particular temperature employed will depend on the alcohol which is being converted, the particular catalyst used and the other operating conditions. Preferably, the reaction is carried out in the presence of potassium hydroxide as the catalyst and at a temperature between about 240° C. and 270° C.

Pressure is of importance in the process, primarily as a means of maintaining the reactants in the desired physical state. Thus, sufficient pressure is employed to maintain the starting alcohol in the liquid state and this pressure will vary depending on the temperature at which the reaction is carried out. More elevated pressures can be employed if desired, however, they are not ncessary and where possible, the reaction is ordinarily carried out at atmospheric pressure.

The reaction proceeds readily with the time required varying inversely with catalyst concentration and temperature. Broadly, the reaction time can vary from about 0.1 hour to as high as about 50 hours or higher. Preferably, however, the reaction is carried out within a time period of between about 1 and about 8 hours.

A wide variety of alcohols can be converted to the dimer alcohol within the scope of the invention. In the broad aspect of the invention, these alcohols are defined as primary alcohols having at least one hydrogen on the beta carbon atom and can be expressed structurally by the following formula:

$$\begin{array}{c} R_1\ H \\ |\ \ | \\ R_2-C-C-OH \\ |\ \ | \\ R_3\ H \end{array}$$

wherein at least one R is hydrogen and at least one R is hydrocarbon, e.g., alkyl, aryl, cycloalkyl, alkaryl and aralkyl. While there is no particular limitation on the number of carbon atoms which can be present in the hydrocarbon groups, more usually the alcohols include those containing from 3 to about 20 carbon atoms. Of the various types of alcohols which can be used in carrying out the invention, there are included preferably the normal primary alcohols, such as, n-propanol, n-hexanol, n-dodecanol. In addition, the alcohols include the branched chain primary alcohols, such as, 2-methylbutanol, 2 - butyloctanol, 2 - octyldodecanol, 2-methyloctanol and the like; and primary alcohols containing cyclic substituents and aromatic substituents, such as, 2-phenylethanol, 2-benzyloctanol, 2-cyclopentyldodecanol, 2 - cyclohexylphentanol, 2-methylcyclohexylheptanol, 2-benzylpentanol and the like.

The catalyst which is employed in effecting the dimerization reaction is preferably selected from the alkali-metal hydroxides, that is, sodium hydroxide, potassium hydroxide, lithium hydroxide, etc. In addition, the alkali metals can also be employed as catalysts and the catalysts also include the alkali-metal alcoholates in which the hydrocarbon portion of the alcoholate corresponds to the hydrocarbon portion of the alcohol reactant. Sodium hydroxide and potassium hydroxide are the catalysts which are more usually employed and of these, potassium hydroxide is preferred.

The amount of catalyst employed in carrying out the dimerization reaction is important since a high degree of selectivity is obtained only within a relatively narrow range of catalyst concentraton. Thus, the amount of catalyst employed in the practice of the invention must be less than 3 mole percent based on the alcohol reactant and preferably, is not greater than about 2 percent. The catalyst concentration affects not only selectivity but also is a very important factor in the reaction time, with the time required decreasing as the catalyst concentration is increased. In view of this, it is preferred to use as much catalyst as possible, preferably at least 1 percent, however, smaller amounts of catalyst can effectively be employed, and any catalytic amount as readily ascertained by those within the skill of the art can be used in carrying out the invention.

Numerous examples could be presented to illustrate specific alcohols and catalysts employed and their conversion. The following examples are submitted only by way of illustration and not of limitation, to exemplify various specific aspects of the invention.

EXAMPLES

| Alcohol $R_2-\underset{R_3}{\underset{|}{C}}-\underset{H}{\underset{|}{C}}-OH$ | | | Catalyst |
|---|---|---|---|
| $R_1$ | $R_2$ | $R_3$ | |
| H | $C_{10}H_{21}$ | $C_8H_{17}$ | NaOH |
| H | $C_6H_5CH_2$ | $C_6H_{13}$ | K |
| H | $CH_3$ | $C_2H_5$ | $CH_3-\underset{H}{\underset{|}{C}}-\underset{}{\overset{C_2H_5}{\underset{|}{C}}}-OK$ |
| H | $C_6H_{11}$ | $C_3H_7$ | $C_6H_{11}-\underset{H}{\underset{|}{C}}-\underset{}{\overset{C_3H_7}{\underset{|}{C}}}-ONa$ |
| H | $C_6H_{13}$ | $CH_3$ | KOH |
| H | $C_6H_5$ | H | Na |
| H | $C_5H_9$ | $C_{10}H_{21}$ | $C_5H_9-\underset{H}{\underset{|}{C}}-\underset{}{\overset{C_{10}H_{21}}{\underset{|}{C}}}-ONa$ |
| H | $C_4H_9$ | $C_4H_9$ | KOH |
| H | $C_6H_{10}CH_2$ | $C_5H_{11}$ | LiOH |
| H | $C_{16}H_{33}$ | H | Ce |
| H | $C_6H_5CH_2$ | $C_3H_7$ | KOH |
| H | $C_4H_9$ | H | $C_4H_9-\underset{H}{\underset{|}{C}}-\underset{H}{\underset{|}{C}}-OLi$ |
| H | $C_6H_{11}$ | H | CeOH |
| H | $C_4H_7$ | $C_{10}H_{21}$ | Li |
| H | $C_8H_{17}$ | H | $C_8H_{17}-\underset{H}{\underset{|}{C}}-\underset{H}{\underset{|}{C}}-OCe$ |
| H | $C_3H_7$ | $CH_3$ | NaOH |
| H | $C_{14}H_{29}$ | H | KOH |

In order to obtain the high degree of selectivity which characterizes the process of this invention, it is necessary that water which forms during the dimerization reaction be removed from contact with the reaction mixture. This can be accomplished in several ways, for example, the water is readily removed by carrying out the reaction in the presence of a dehydrating agent such as calcium hydroxide or calcium hydride. Water removal can also be effected by distillation and which readily occurs with many of the alcohol reactants since the reaction conditions of temperature and pressure are such that water formed in the reaction is distilled therefrom. In those instances where the reaction conditions are not conducive to the removal of water, this deficiency can be remedied by employment of an azeotrope such as xylene, benzene and the like.

The yields which are obtained in the dimerization reaction will vary depending upon the alcohol reactant, the catalyst and amount thereof and the particular reaction conditions employed. Any alcohol which is not converted in the reaction can be separated from the reaction product and if desired, recycled to the reaction. The reaction can be carried out either as a batch process or as a continuous process, preferably with recycle of unconverted alcohol.

The following examples are presented in illustration of the invention.

Examples

Normal dodecanol was added to a three-necked glass flask equipped with a stirrer, thermometer and a trap attached to a condenser. Potassium hydroxide catalyst was added to the flask and the mixture was heated and maintained at an elevated temperature until the reaction was complete (distillation of water stopped). The flask was then cooled to about 70° C. to 90° C. and acidified with 25 percent hydrochloric acid. After separation, the organic layer was washed with hot water until a pH of 6.5–6.8 was obtained. The organic layer was then distilled into four cuts.

Cut 1  IBP to about 155° C. at 0.1–0.5 mm.—monomer alcohol
Cut 2  to about 170° C. at 0.1–0.5 mm.—intermediate
Cut 3  to about 205° C. at 0.1–0.5 mm.—dimer alcohol
Cut 4  to about 250° C. at 0.1–0.5 mm.—part dimer alcohol Cuts 1 and 3 were analyzed by chemical analysis and cuts 2 and 4 were analyzed by GLPC.

The amount of dimerized alcohol obtained in the experiments was ascertained, the results being presented in the following table.

TABLE.—DIMERIZATION OF N-DODECANOL (ATMOSPHERIC PRESSURE)

| Run No | 1 | 2 | 3 | 4 | 5[1] | 6[1] | 7 | 8 | 9 |
|---|---|---|---|---|---|---|---|---|---|
| Catalyst, Mole Percent | 8.8 | 8.8 | 4.4 | 2.2 | 2.2 | 2.2 | 1.0 | 1.0 | 1.0 |
| Alcohol, Moles | 16.82 | 5.38 | 5.38 | 5.38 | 3.83 | 1.73 | 5.31 | 5.31 | 5.31 |
| Product, Moles | 12.20 | 4.31 | 3.87 | 3.33 | 2.24 | 1.23 | 2.90 | 2.83 | 3.57 |
| Reaction Temp., °C | 250 | 250 | 250 | 250 | 250 | 252 | 254 | 256 | 250–280 |
| Reaction Time, Minutes | 240 | 165 | 120 | 180 | 240 | 240 | 360 | 360 | 360 |
| Conversion to Dimer, Mole Percent | 72.5 | 80.0 | 72.0 | 61.8 | 58.5 | 71.1 | 54.6 | 53.2 | 67.3 |
| Selectivity, Mole Percent | 76.8 | 80.2 | 85.8 | 88.3 | 80.7 | 90.0 | 90.7 | 90.9 | 89.9 |
| Yield, Mole Percent | 55.7 | 64.2 | 61.8 | 54.6 | 47.2 | 63.9 | 49.5 | 48.3 | 60.5 |

[1] Recycle of recovered n-dodecanol alcohol.

It is apparent from the data in the table that catalyst concentration has a very substantial effect on the degree of selectivity of the dimerization reaction. Thus, when employing from 1–2.2 percent catalyst, very high selectivities in the order of about 90 percent were obtained. With higher catalyst concentrations, the selectivity decreased sharply ranging from the mid 70's to the mid 80's.

Although this invention has been described with respect to particular embodiments thereof, it is not to be so limited, as changes and modifications may be made therein which are within the spirit and scope of the invention as defined by the appended claims.

I claim:

1. The process of effecting condensation of a primary hydrocarbon alcohol having the formula:

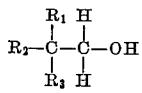

wherein at least one R is hydrogen and at least one R is hydrocarbon seelcted from the group consisting of alkyl, aryl, cycloalkyl, alkaryl and aralkyl to a 2-branched alcohol which comprises treating said primary alcohol in the presence of a catalytic amount in the range 1 to 2.2 mole percent based on feed alcohol of a material selected from the group consisting of alkali metals, alkali-metal hydroxides and alkali-metal alcoholates for a period of 0.1 to 50 hours at a temperature in the range 200 to 300° C. and under sufficient pressure to maintain said primary alcohol in liquid state and removing water as formed from contact with the reaction mixture.

2. The process of claim 1 in which the catalyst is an alkali-metal hydroxide.

3. The process of claim 2 in which the catalyst is potassium hydroxide.

4. The process of claim 2 in which the alcohol contains from 3 to about 20 carbon atoms.

5. The process of claim 4 in which the water is removed from contact with the reaction mixture by dehydration agent.

6. The process of claim 4 in which the water is removed from contact with the reaction mixture by distillation.

7. The process of claim 6 in which the distillation is azeotropic distillation.

8. The process of effecting condensation of at least one straight chain primary alkanol to a 2-branched alcohol which comprises subjecting said primary alkanol to a temperature between about 200° C. and about 300° C. at a pressure sufficient to maintain the primary alcohol in the liquid state in the presence of a catalytic amount in the range 1 to 2.2 mole percent of an alkali-metal hydroxide for a period in the range 0.1 to 50 hours and removing water as formed from contact with the reaction mixture.

9. The process of claim 8 in which the catalyst is potassium hydroxide.

10. The process of claim 8 in which the alkanol contains from 3 to about 20 carbon atoms.

11. The process of claim 8 in which the water is removed from contact with the reaction mixture by a dehydration agent.

12. The process of claim 8 in which the water is removed from contact with the reaction mixture by distillation.

13. The process of claim 12 in which the distillation is azeotropic distillation.

14. The process of effecting condensation of a mixture of straight chain primary alkanols containing from 6 to 10 carbon atoms to 2-branched alcohols which comprises reacting said primary alkanols in the presence of a catalytic amount in the range 1 to 2.2 mole percent of an alkali-metal hydroxide at a pressure sufficient to maintain the primary alkanol in liquid state, at a temperature in the range 200–300° C. and for a period in the range 0.1 to 50 hours and removing water as formed from contact with the reaction mixture.

15. The process of effecting condensation of normal dodecanol to 2-decyltetradecanol which comprises subjecting said normal dodecanol to a temperature between about 240° C. and about 270° C. at a pressure sufficient to maintain said normal dodecanol in the liquid state in the presence of a catalytic amount in the range 1 to 2.2 mole percent of potassium hydroxide for a period in the range 0.1 to 50 hours and removing water as formed from contact with the reaction mixture.

16. The process of claim 15 in which unconverted normal dodecanol is separated from the reaction product and recycled to the reaction.

References Cited

UNITED STATES PATENTS

| | | | |
|---|---|---|---|
| 2,457,866 | 1/1949 | Carter | 260—642 |
| 2,829,177 | 4/1958 | Cull et al. | 260—642 |
| 2,836,628 | 5/1958 | Miller | 260—632 |
| 3,119,880 | 1/1964 | Kollar et al. | 260—642 |

LEON ZITVER, *Primary Examiner.*

J. E. EVANS, *Assistant Examiner.*